United States Patent

Andersson

[11] Patent Number: 6,063,220
[45] Date of Patent: May 16, 2000

[54] METHOD AND AN APPARATUS USING ULTRASOUND FOR FIXEDLY WELDING A CIRCULAR MATERIAL BLANK

[75] Inventor: Anders Andersson, Staffanstorp, Sweden

[73] Assignee: Tetra Laval Holdings & Finance S.A., Pully, Switzerland

[21] Appl. No.: 09/068,207

[22] PCT Filed: Jun. 12, 1996

[86] PCT No.: PCT/SE96/01606

§ 371 Date: May 5, 1998

§ 102(e) Date: May 5, 1998

[87] PCT Pub. No.: WO97/23339

PCT Pub. Date: Jul. 3, 1997

[30] Foreign Application Priority Data

Dec. 22, 1995 [SE] Sweden ................................. 9504629

[51] Int. Cl.[7] .................................................. B32B 31/16
[52] U.S. Cl. .................... 156/73.1; 156/285; 156/580.2; 264/445; 425/174.2
[58] Field of Search .................... 156/69, 73.1, 308.2, 156/309.6, 580.1, 580.2, 285; 264/442, 443, 445; 425/174.2

[56] References Cited

U.S. PATENT DOCUMENTS

| | | | |
|---|---|---|---|
| 3,712,844 | 1/1973 | Ratten et al. | 161/38 |
| 3,947,307 | 3/1976 | Buchscheidt | 156/73.1 |
| 4,014,724 | 3/1977 | Rausing | 156/86 |
| 4,129,467 | 12/1978 | Knutsson | 156/84 |
| 4,417,933 | 11/1983 | Bernat | 156/64 |
| 4,702,410 | 10/1987 | Derving | 229/184 |
| 4,992,219 | 2/1991 | Meunier | 264/23 |
| 5,244,520 | 9/1993 | Gordon et al. | 156/73.1 |
| 5,255,842 | 10/1993 | Rosén | 229/137 |
| 5,275,767 | 1/1994 | Micciche | 264/23 |
| 5,304,265 | 4/1994 | Keeler | 156/64 |
| 5,431,763 | 7/1995 | Bradshaw | 156/256 |
| 5,551,211 | 9/1996 | Kennedy et al. | 53/371.7 |
| 5,676,786 | 10/1997 | Mizuno et al. | 156/245 |

FOREIGN PATENT DOCUMENTS

| | | |
|---|---|---|
| 2 011 529C1 | 4/1994 | Russian Federation . |
| 1 676 820 | 9/1988 | U.S.S.R. . |

OTHER PUBLICATIONS

Derwent Abstract No. 92–198180 for SU 676820.
Derwent Abstract No. 95–029079 for RU 2011529.

*Primary Examiner*—James Sells
*Attorney, Agent, or Firm*—Burns, Doane, Swecker & Mathis, L.L.P.

[57] ABSTRACT

In the manufacture of packaging containers, for example blown plastic bottles, a circular material blank is, in certain cases, fixedly welded to the end of a sleeve-shaped casing portion. It is advantageous from amongst other energy viewpoint if the welding can take place using ultrasound, but in this instance it has been proved that the central region to the circular blank absorbs ultrasonic energy to such an extent that it is deformed or breaks. A method of using ultrasound to fixedly weld a circular material blank without such drawbacks occurring is proposed according to the present invention in that the oscillations caused by the ultrasound are reduced by a mechanical stabilization of the central region of the circular blank, which is put into effect with the aid of a vacuum and a relief pattern provided in the central region of the circular blank. An apparatus for employing ultrasound to fixedly weld a circular material blank in place displays a counter abutment with a work surface for fixedly retaining the circular material blank, the work surface forming a part of a vacuum chamber, and support means for the central region of the circular blank during the welding cycle.

11 Claims, 1 Drawing Sheet

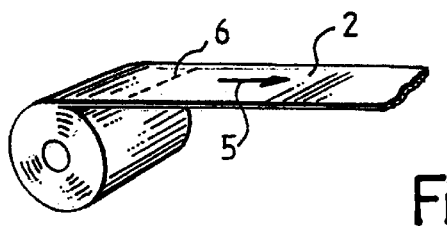
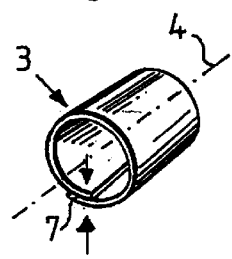
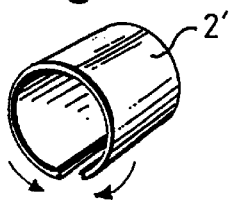
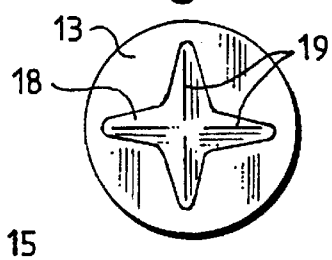
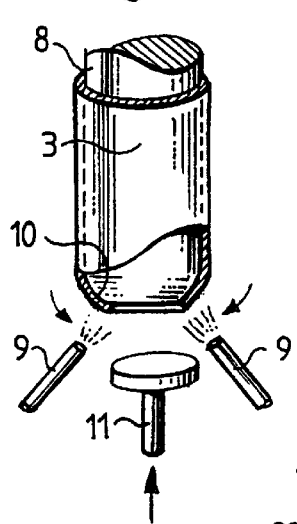
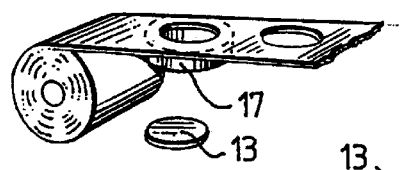
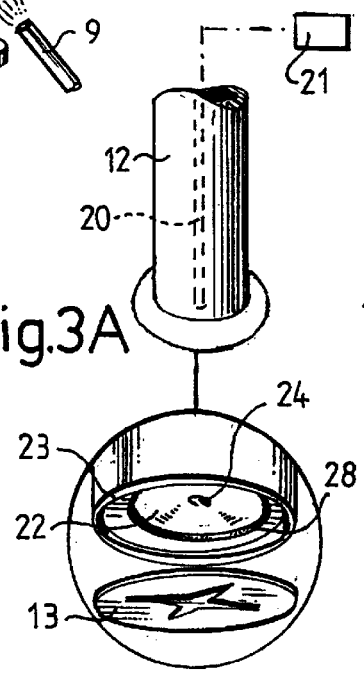
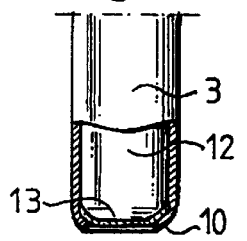
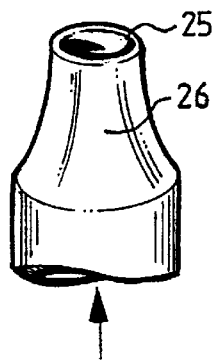

METHOD AND AN APPARATUS USING ULTRASOUND FOR FIXEDLY WELDING A CIRCULAR MATERIAL BLANK

TECHNICAL FIELD

The present invention relates to an ultrasound method of fixedly welding a circular material blank which, together with the object to which it is to be fixedly welded, is clamped between an annular ultrasound horn and a counter abutment. The present invention also relates to an apparatus for using ultrasound to fixedly weld a circular material blank to an object, the apparatus comprising an ultrasound horn with an annular welding surface and a counter abutment.

BACKGROUND ART

Consumer beverages such as juice, sports drinks or similar uncarbonated or "flat" beverages can be packed in, for example, plastic bottles of polyester (PET). This type of bottle is normally produced from injection moulded blanks or preforms which are manufactured from a central source and then supplied to bottle blowing machines. In the bottle blowing machine, the preform is heated and mechanically stretched in its longitudinal direction, whereafter it is subjected to a pressure difference and is inflated to abutment against the inside of a twin body mould.

A similar type of blown plastic bottle is also manufactured in that a prefabricated hollow preform is given the desired container form by heating and inflation in an enclosing or envelope mould. However, instead of using as starting material an injection moulded preform, the preform is manufactured from web-shaped thermoplastic material, e.g. polyester (PET), or high density polyethylene (HDPE), in which instance one web is formed into a cylinder while the other web is used for producing bottom sections which are fixedly welded to the cylinder so that a preform or parison is created. By manufacturing the preform from web-shaped material, it is possible to minimise material consumption at the same time as utilising in a simple manner laminated material, including, for example, layers of gas barrier material.

The parts thus formed from two material webs, i.e. a tubular casing portion and a substantially circular bottom plate, can be connected to one another in a liquid-tight welding joint with the aid of heat and pressure. In such instance, the conventional wisdom is to make use of, for example, hot air nozzles which heat the edge regions of both of the parts to the softening or fusion temperature of the plastic material, whereafter the parts are brought together and urged together until such time as the material has fused and stabilised. In this case, a certain amount of heat is supplied which, for various reasons such as the working environment and energy consumption, should be cut to a minimum. Excessive heating of the edge regions of both of the parts also involves a risk of permanent thermal deformation of adjacent areas at the same time as the cooling operation takes longer, which reduces production output rates. Another method of heating and sealing the two parts to one another has therefore been tested, namely the use of an ultrasound horn with a substantially annular work surface which, with the aid of a substantially mandrel-like counter abutment disposed in the sleeve, presses together the edge regions of both the bottom portion and the casing portion under the simultaneous supply of energy. Theoretically, this welding method should be rapid and feasible with reduced energy consumption, but practical trials and experiments have shown that the ultrasonic energy is conducted to and concentrated at the central region of the bottom plate, which, as a result, is readily deformed and breaks in connection with the ultrasound welding operation. In a circular bottom plate, a central hole of a few millimetres in diameter passing through the bottom plate typically arises in connection with the welding operation. It has proved in the trials conducted that this problem generally occurs in ultrasound welding of bottom plates or circular blanks and it has hitherto not proved possible using prior art methods wholly to obviate this drawback. Since a not inconsiderable proportion of the ultrasonic energy is led to the central region of the bottom plate, the heating of the actual welding site is correspondingly reduced, i.e. the circular bottom weld joint, with the result that incomplete or weakened welding joints are obtained. There is thus a general need in the art to realise a method of making possible ultrasound welding of an annular area on circular material blanks without the central region of the circular blanks being subjected to damage.

OBJECTS OF THE INVENTION

The Method

One object of the present invention is therefore to realise a method which makes for the ultrasound fixed welding of circular material blanks to another object, for example a sleeve-shaped casing for a packaging container, without negatively affecting the central region of the circular blank in any way, or causing damage, for example in the form of holes.

A further object of the present invention is to realise a method for ultrasound welding of circular material blanks which makes possible a rapid and uncomplicated welding cycle utilising substantially conventional, known equipment for ultrasonic welding.

Yet a further object of the present invention is to realise a method of ultrasound welding of a circular material blank which is economical in terms of energy, which is well-suited for rapid production output of packaging container blanks, and which does not suffer from the above-outlined drawbacks.

Solution

The above and other objects have been attained according to the present invention in that a method of using ultrasound to fixedly weld a circular material blank which, together with the object to which it is to be fixedly welded, is clamped between an annular ultrasound horn and a counter abutment is given the characterizing feature that oscillations in the central region of the circular blank caused by the ultrasound are restricted by mechanical action on the circular blank.

Preferred embodiments of the method according to the present invention have further been given the characterizing features as set forth in the subclaims.

There is also a need in the art to realise an apparatus for reducing the method according to the present invention into practice, such an apparatus being designed so as to obviate the above-considered drawbacks, i.e. to prevent damage occurring to the central region of a circular material blank which is united in an annular weld to another object, for example a tubular casing for a packaging container blank.

OBJECTS OF THE INVENTION

The Apparatus

A further object of the present invention is thus to realise an apparatus for using ultrasound to fixedly weld in annular fashion a circular material blank, the apparatus including means for preventing the central region of the circular material blank from being damaged in connection with the ultrasound welding operation.

Still a further object of the present invention is to realise an apparatus for carrying out the method of the invention, the apparatus making it possible reliably and rapidly to seal together the tubular casing portion of a packaging container blank with a circular material blank serving as a bottom plate.

Yet a further object of the present invention is to realise an apparatus for carrying out the method according to the invention, the apparatus being simple and reliable and well-suited for use in the high-speed production of packaging container blanks.

Solution

These and other objects have been attained according to the present invention in that an apparatus for using ultrasound to fixedly weld a circular material blank to another object, the apparatus including an ultrasound horn with an annular welding surface and a counter abutment, has been given the characterizing feature that it has a work surface for fixedly retaining the circular material blank, the work surface displaying means for supporting the central region of the circular blank during the welding cycle.

Preferred embodiments of the apparatus according to the present invention have further been given the characterizing features as set forth in the subclaims.

BRIEF DESCRIPTION OF THE ACCOMPANYING DRAWINGS

One preferred embodiment of both the method and the apparatus according to the present invention will now be described in greater detail hereinbelow, with particular reference to the accompanying schematic Drawings, showing only those parts and details indispensable to an understanding of the present invention. In the accompanying Drawings:

FIGS. 1A, 1B, 1C and 1D stepwise illustrate the manufacture of a sleeve-shaped casing portion whose one end is to be provided with a circular material blank using the method according to the invention;

FIG. 2A shows the manufacture of a circular material blank, while FIGS. 2B and 2C show a finished circular material blank in cross section and in top plan view, respectively;

FIGS. 3A and 3B show the installation and welding in place of the circular material blank to the casing portion using an apparatus according to the present invention; and FIG. 4 shows a finished preform or parison for a packaging container.

DESCRIPTION OF PREFERRED EMBODIMENT

The method and the apparatus according to the present invention may be employed for using ultrasound to fixedly weld a circular material blank of thermoplastic material to the desired type of object, but, in order to illustrate the present invention, the method and the apparatus will be described hereinbelow as they may be employed in the manufacture of tubular or sleeve-shaped packaging containers, parisons or preforms for later reforming into, for example, blown plastic bottles with the aid of known bottle blowing technology. In such instance, the packaging container or preform 1 is manufactured from thermoplastic material, e.g. polyester (PET) or high density polyethylene (HDPE), or alternatively from a multilayer material. Preferably, the material is in the form of a material web 2, 14 which may consist of one or more plastics types which are laminated or otherwise bonded to one another. The web-shaped material is supplied in the rolled-up state to a per se known machine for the production of tubular sleeves 3 which are manufactured by the convolute winding of the material web 2, the orientation being such in relation to the material web that the centre axis 4 of the sleeve 3 extends transversely in relation to the extrusion or orientation direction 5 of the material web 2. Because of the orientation of the material, the thus produced sleeve 3 will hereby have a capability on heating to shrink together to a smaller diameter which, as will be explained later, is utilised in the forming of one end of the sleeve 3. More precisely, the material web 2 is divided at uniform and even spaces (indicated by means of a broken line 6 which is transverse in relation to the material web) into individual blanks 2', which, in a per se known manner by heating and mechanical processing, are rolled up into substantially cylindrical form with overlapping edge portions which, by heating and mechanical processing, are caused to fuse together for the formation of a casing weld joint 7 which, in the finished preform, will thus extend vertically. This sleeve production technique is per se well known in the art and is described, for example, in Swedish Patent No. SE 75100925, to which reference is now made for further details.

FIG. 1D shows how the casing or sleeve 3 formed in accordance with the foregoing and provided with the casing weld joint 7 is placed on a forming tool 8 which is shaped like a mandrel and is of a diameter which is but insignificantly less than the inner diameter of the sleeve 3 (sliding fit). The tool 8 further has a rounded lower end outside which the sleeve 3 is permitted to project somewhat. The projecting, lower sleeve portion is heated by means, for example, of hot air from nozzles 9 to such a temperature that the material softens or plasticizes and that the inherent shrinkage properties of the material as a result of the extrusion direction are activated such that the projecting sleeve portion is caused to shrink to an inwardly directed anchorage portion or flange 10 which, with the aid of a vertically movable pressing tool 11, is urged against the substantially planar lower end of the forming tool 8 and hereby obtains a well-defined configuration at a right angle to the vertical wall portion of the sleeve 3. Once the lower end of the sleeve has been allowed to cool, the sleeve 3 is removed from the forming tool 8 and is transferred to a counter abutment 12, at which the application and fixing of the bottom of the preform 1 will take place.

Bottom plates or circular blanks 13 are produced (preferably simultaneously with the production of the sleeves 3) from web-shaped material 14 of the same type as in the material web 2. The material web 14 is advanced stepwise past a conventional punching tool 15, which comprises a reciprocating punch 16 and an annular die 17. On the activation of the punching tool 15, the circular blanks 13 are punched in a per se known manner out of the material web 14. The circular blanks are thereafter conveyed further for forming processing. Depending upon the choice of materials, this may possibly require a heating of the material in the circular blanks to suitable thermoforming temperature, while for example polyester may be formed by mechanical processing at room temperature. Using two co-operating press tools (not shown) with profiled work surfaces, each individual circular blank 13 is provided in its central region with a relief pattern 18, for example as shown in FIG. 2C in the form of a four-pointed star whose tips are located a distance from the edge of the circular blank 13. Other relief patterns may also be selected, the important feature being that the pattern possess a number of radial components extending out from the centre and towards the periphery of the circular blank 13. The illustrated stellar configuration imparts to the circular blank four radial rigidifying ridges 19 which, according to the present invention, have proved to be extremely effective in preventing the oscillation movements which, in connection with ultrasound welding of the circular blank to the sleeve 3, tend to inflict permanent damage on the circular blank.

The thus finished blank 13 is thereafter placed at the lower end of the previously mentioned mandrel-shaped counter abutment 12. The counter abutment 12 includes a central vacuum duct 20 whose one end may be connected to a vacuum source 21 and whose other end discharges at the lower end of the counter abutment 12. More precisely, the lower end of the counter abutment 12 displays a central, countersunk surface 22 and a surrounding edge 23 which defines the countersunk surface region 22. The countersunk surface region 22 further carries a centrally located, annular flexible seal 28, for example in the form of an O-ring which, once the circular blank 13 has been applied to the lower end of the counter abutment 12, defines a chamber at whose central region the vacuum duct has its discharge aperture 24. On activation of the vacuum source 21, a circular blank 13 abutting against the lower end of the counter abutment 12 will be retained by means of the vacuum which is built up in the vacuum chamber formed by the seal 28, the surface 22 and the circular blank 13 proper. The vacuum is propagated and distributed to the entire central region of the circular blank with the aid of the relief pattern 18 of the blank 13, the relief pattern being located substantially within the area defined by the seal 28 and, by abutment against the surface 22, prevents the circular blank 13 from being sucked into sealing closure against the aperture 24 in the event of excessively powerful vacuum. As a result of the mechanical abutment—reinforced by the vacuum—the circular blank 13 will be stabilised and "clamped" in a direction towards the aperture 24 of the vacuum duct 20, which makes the circular blank 13 less flexible and prevents oscillations from occurring in the central region of the blank 13.

Once the blank 13 has thus been applied to the lower end of the counter abutment 12, a sleeve 3 manufactured in the manner described in the foregoing is passed over the counter abutment 12 so that the inwardly folded flange or anchorage portion 10 of the sleeve surrounds the edge region of the circular blank 13, i.e. that region of the blank 13 which is not provided with relief pattern. The bottom plate 13 will thus abut against the inner surface of the flange 10 where the edge region of the bottom plate overlaps the anchorage portion or flange, and, by bringing an ultrasound horn 26 provided with an annular work surface 25 into contact with the overlapping portions of the bottom plate 13 and the sleeve 3, a heat sealing of the bottom plate 13 to the one side of the anchorage portion or flange 10 will take place during simultaneous compression of the overlapping material parts. Because of the above-described stabilisation of the bottom plate 13 achieved by means of the method and the apparatus according to the present invention, transfer of the ultrasonic oscillations to the central region of the bottom plate 13 will be considerably reduced, as a result of which the energy can be concentrated to the welding site with a minimum of loss. The thus realised, substantially circular bottom weld joint 27 will, like the casing weld joint 7, be compressed and totally liquid-tight, which is a basic prerequisite for ensuring the function of the packaging container or preform 1. As a result of the previously described measure of providing the bottom plate 13 with a central relief pattern which is utilised for mechanically fixing, with the aid of a vacuum, the circular blank to the lower end of the counter abutment 12, the risk will be avoided that oscillations which negatively affect the material occur in the central region of the bottom plate 13 during the ultrasound welding operation, and, in practice, this solution has proved to completely obviate the previously occurring deformations or holes in the central region of the bottom plate 13.

The preform 1 (FIG. 4) produced in the above-described manner thus now comprises a substantially cylindrical casing portion with a vertically extending casing wall joint 7 and a bottom portion comprising the bottom plate 13 which is connected to the casing portion via the substantially circular bottom weld joint 27. Production of the container may hereby possibly be completed, but it is also conceivable to utilise the thus produced container as a preform or parison for the production of blown plastic bottles in a per se known manner.

As one alternative to the above-described embodiment of the circular blank instead of (or as a complement to) the relief pattern of the blank 13, an embodiment is conceivable in which correspondingly operating patterns are provided on the end surface of the counter abutment. Stellar grooves, ducts or an air-permeable (sintered) surface for propagating the vacuum and ensuring that the circular blank is stabilised have, however, in practical trials only given limited results and it would appear to be demonstrated that optimum stabilisation and damping can only be attained using the combination of measures and practical arrangements and means as are defined in one or more of the appended claims.

What is claimed is:

1. A method of using ultrasound to fixedly weld a circular material blank to an object comprising the steps of:
   a) forming a plurality of radial formations that extend from the center of the blank toward the periphery of the blank;
   b) clamping the blank and the object between an ultrasonic horn and a counter abutment; and
   c) applying ultrasonic energy to the blank and to the object;

whereby oscillations in the material of the blank at the center region of the blank are restricted, at least in part by the radial formations.

2. The method as claimed in claim 1, wherein the circular blank is clamped to a work surface of the counter abutment by a vacuum.

3. The method as claimed in claim 2, wherein the vacuum acts upon a central region of the free surface of the circular blank.

4. The method as claimed in claim 1, wherein the radial formations form a relief pattern.

5. The method as claimed in claim 4, wherein the radial formations are formed by thermoforming.

6. The method as claimed in claim 4, wherein the radial formations comprise ridges or creases.

7. The method of claim 1, wherein the circular blank has a solid center region.

8. A system for using ultrasound to fixedly weld a circular material blank having radial formations extending from the center of the blank toward the periphery of the blank to an object, the system comprising an ultrasound horn with an annular weld surface and a counter abutment, the counter abutment has a work surface for fixedly retaining the circular material blank, said work surface having means for supporting the central region of the circular blank and which surrounds the radial formations during the welding cycle.

9. The system as claimed in claim 8, wherein the work surface includes a vacuum chamber defined at least partially by one side of the circular blank.

10. The system as claimed in claim 9, wherein the vacuum chamber is further defined by an annular seal abutting against the circular blank and surrounding a vacuum duct discharging into the work surface.

11. The system as claimed in claim 8, wherein the work surface constitutes a part of the counter abutment.

* * * * *

UNITED STATES PATENT AND TRADEMARK OFFICE
CERTIFICATE OF CORRECTION

PATENT NO. : 6,063,220
DATED : May 16, 2000
INVENTOR(S) : Anders ANDERSSON

It is certified that error appears in the above-identified patent and that said Letters Patent is hereby corrected as shown below:

ON THE TITLE PAGE:

Item [22] PCT Filed: "Jun. 12, 1996" should read -- Dec. 6, 1996 --.

Signed and Sealed this

Sixth Day of March, 2001

*Attest:*

NICHOLAS P. GODICI

*Attesting Officer*        *Acting Director of the United States Patent and Trademark Office*